(12) United States Patent
Fukushima

(10) Patent No.: US 9,232,082 B2
(45) Date of Patent: Jan. 5, 2016

(54) REMOTE SUPPORT APPARATUS, ELECTRONIC APPARATUS, REMOTE SUPPORT METHOD, AND STORAGE MEDIUM

(71) Applicant: CANON KABUSHIKI KAISHA, Tokyo (JP)

(72) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/462,229

(22) Filed: Aug. 18, 2014

(65) Prior Publication Data

US 2015/0055165 A1    Feb. 26, 2015

(30) Foreign Application Priority Data

Aug. 21, 2013    (JP) ................................ 2013-171550

(51) Int. Cl.
*G06F 15/00* (2006.01)
*H04N 1/00* (2006.01)
*G06F 11/07* (2006.01)

(52) U.S. Cl.
CPC ........ *H04N 1/00079* (2013.01); *G06F 11/0733* (2013.01); *G06F 11/0784* (2013.01); *H04N 1/00015* (2013.01); *H04N 1/00061* (2013.01); *H04N 1/00084* (2013.01); *H04N 2201/0003* (2013.01)

(58) Field of Classification Search
None
See application file for complete search history.

(56) References Cited

U.S. PATENT DOCUMENTS

| 2004/0260704 | A1 | 12/2004 | Moore | |
|---|---|---|---|---|
| 2010/0302586 | A1* | 12/2010 | Takahashi et al. | 358/1.15 |
| 2013/0055035 | A1* | 2/2013 | Nakatsu | 714/48 |
| 2014/0250241 | A1* | 9/2014 | Barber | 709/245 |

FOREIGN PATENT DOCUMENTS

| EP | 2549373 A2 | 1/2013 |
|---|---|---|
| JP | 2013-045198 A | 3/2013 |
| JP | 2013-045200 A | 3/2013 |

\* cited by examiner

*Primary Examiner* — Helen Q Zong
(74) *Attorney, Agent, or Firm* — Canon U.S.A., Inc. IP Division

(57) ABSTRACT

An image forming apparatus including a plurality of processing units capable of performing different support processing for a user asking for support, and a remote support apparatus operated by an operator are connected via a communication path. The remote support apparatus transmits to the image forming apparatus a request to perform the support using the selected processing unit, or a request to switch the processing unit to a selected specific processing unit and a request to perform the support. The image forming apparatus allows the processing unit which follows the request to perform the support, to perform the support, and switches the processing unit according to the request to switch the processing unit to allow the switched processing unit to perform the support. Further, the image forming apparatus returns a result which should be returned, among results of the performed support, to the remote support apparatus.

13 Claims, 7 Drawing Sheets

REMOTE SUPPORT APPARATUS, ELECTRONIC APPARATUS, REMOTE SUPPORT METHOD, AND STORAGE MEDIUM

BACKGROUND OF THE INVENTION

1. Field of the Invention

The present invention relates to a remote support technique for remotely providing support regarding how to use an electronic apparatus such as an image forming apparatus and a troubleshooting procedure therefor, from a remote location.

2. Description of the Related Art

As it becomes increasingly complicated to use electronic apparatuses such as image forming apparatuses and to perform trouble shooting procedures therefor, it becomes frequent that users of these electronic apparatuses directly inquire to call centers of manufacturers to get answers. Regarding such call centers, Japanese Patent Application Laid-Open Nos. 2013-45198 and 2013-45200 each discuss a terminal apparatus that transmits a predetermined command to an electronic apparatus at a remote location to thereby collect and analyze state information of the electronic apparatus. This terminal apparatus is set up at a call center. The terminal apparatus transmits the predetermined command to the electronic apparatus upon detecting occurrence of an error at the electronic apparatus. The electronic apparatus collects an image of a user operation screen, user operation information, and the state information of the electronic apparatus to transmit them to the terminal apparatus based on the command. The terminal apparatus analyzes the collected information and transmits support data according to a result of the analysis to the electronic apparatus. The electronic apparatus displays a procedure for solving the error based on the support data on the user operation screen.

Japanese Patent Application Laid-Open Nos. 2013-45198 and 2013-45200 suggest that the terminal apparatus discussed therein enables the call center to provide appropriate support to a user according to the status of the electronic apparatus even without telephone communication made between the user asking for support and an operator on the call center side.

However, the above-described terminal apparatus operates under the premise that the support data and an error analysis procedure which is identified based on the support data are predetermined by the support side. Therefore, there is left such a problem that this service cannot necessarily help the user, depending on a content of sought support. More specifically, the information grasped by the call center alone, may not be sufficient for the solution, which makes it difficult to determine an appropriate support measure.

In such a case, a serviceman in charge of technical support physically must visit a user's location to solve the trouble, but this leads to a delay in providing support. If the electronic apparatus runs into a state unexpected by the support side, user's business, especially a user making a commercial product may end up incurring some loss due to that delay.

SUMMARY OF THE INVENTION

The present invention is mainly directed to providing a remote support technique that allows a support side to quickly recognize a present status of an electronic apparatus for which even the support side may not possibly anticipate a solution.

According to an aspect of the present invention, the present invention provides a remote support method for a remotely supporting electronic apparatus including a plurality processing units capable of performing different support processing for a user asking for support. This remote support method starts with establishment of a connection between a remote support apparatus operated by an operator providing support to the user and the electronic apparatus via a communication path.

After connected to the electronic apparatus, the remote support apparatus selects any of the plurality of processing units, and transmits to the electronic apparatus a request to perform the support processing using the selected processing unit, or a request to switch the processing unit to a selected specific unit and a request to perform the support processing using the switched processing unit. Further, the electronic apparatus allows the processing unit which follows the request to perform the support processing from the remote support apparatus, among the plurality of processing units, to perform the support processing, switches the processing unit according to the request to switch the processing unit to allow the switched processing unit to perform the support processing, and returns a result which should be returned, among results of the performed support processing, to the remote support apparatus.

The remote support apparatus acquires the returned result among the results of the support processing performed in the electronic apparatus.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. In the following description, an exemplary embodiment of the present invention will be described with reference to the drawings.

Figure 1:
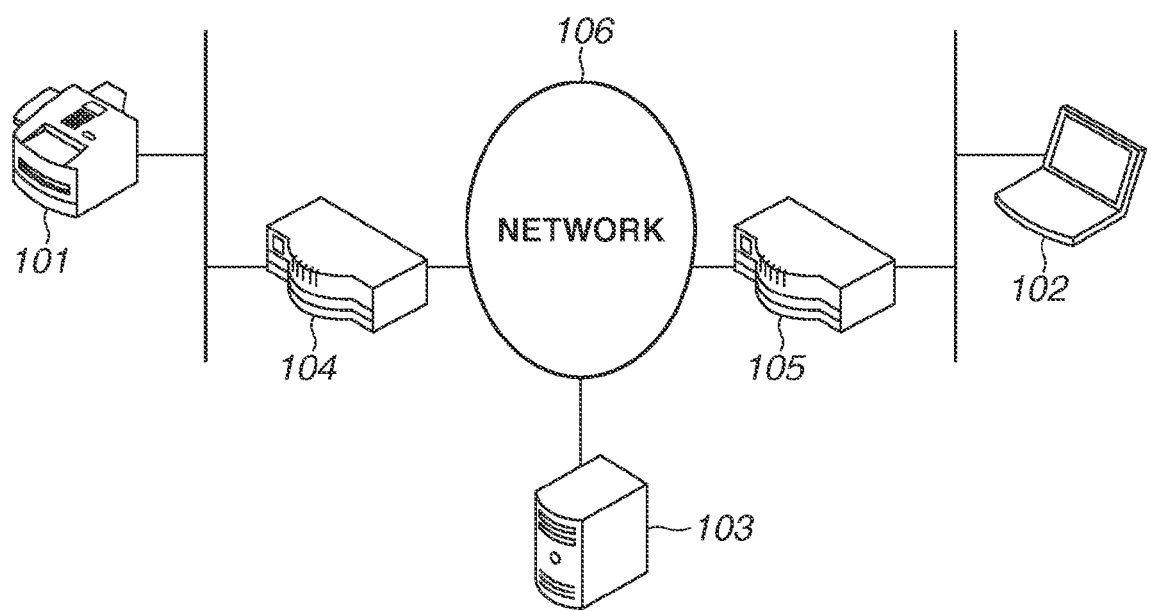
FIG. 1 illustrates an overall configuration of a remote support system according to an exemplary embodiment of the present invention.

FIG. 1 illustrates an overall configuration of a remote support system according to the present exemplary embodiment. The remote support system includes an image forming apparatus 101 that is an example of an electronic apparatus, and a remote support apparatus 102 set up at a call center. Each of the image forming apparatus 101 and the remote support system 102 is a computer having a data communication function of executing call control through Hyper Text Transfer Protocol (HTTP) communication to perform data communication.

The image forming apparatus 101 is connected to a network 106 via a firewall (FW) 104. The remote support apparatus 102 is connected to the network 106 via a FW 105. An HTTP relay server 103 is also connected to the network 106. In HTTP communication, client nodes perform data communication with each other by issuing a POST request or a GET request to a Uniform Resource Identifier (URI) provided from the HTTP relay server 103. The "POST" request is a request to transfer a resource, and the "GET" request is a request to acquire a resource. This mechanism allows the client nodes to perform data communication with each other even when the client nodes are blocked by a private address area or the FWs 104 and 105.

Both the image forming apparatus 101 and the remote support apparatus 102 operate as the above-described "client nodes". The example illustrated in FIG. 1 indicates that the remote support system is configured in such a manner that the client nodes communicate with the network 106 via the FWs 104 and 105 between each other. However, the remote support system may have a network configuration that omits the intervention of the FWs 104 and 105. Further, larger numbers of FWs, image forming apparatuses, and remote support apparatuses than those illustrated in FIG. 1 may be connected to the network 106. Further, the communication protocol does not necessarily have to be HTTP.

Figure 2:
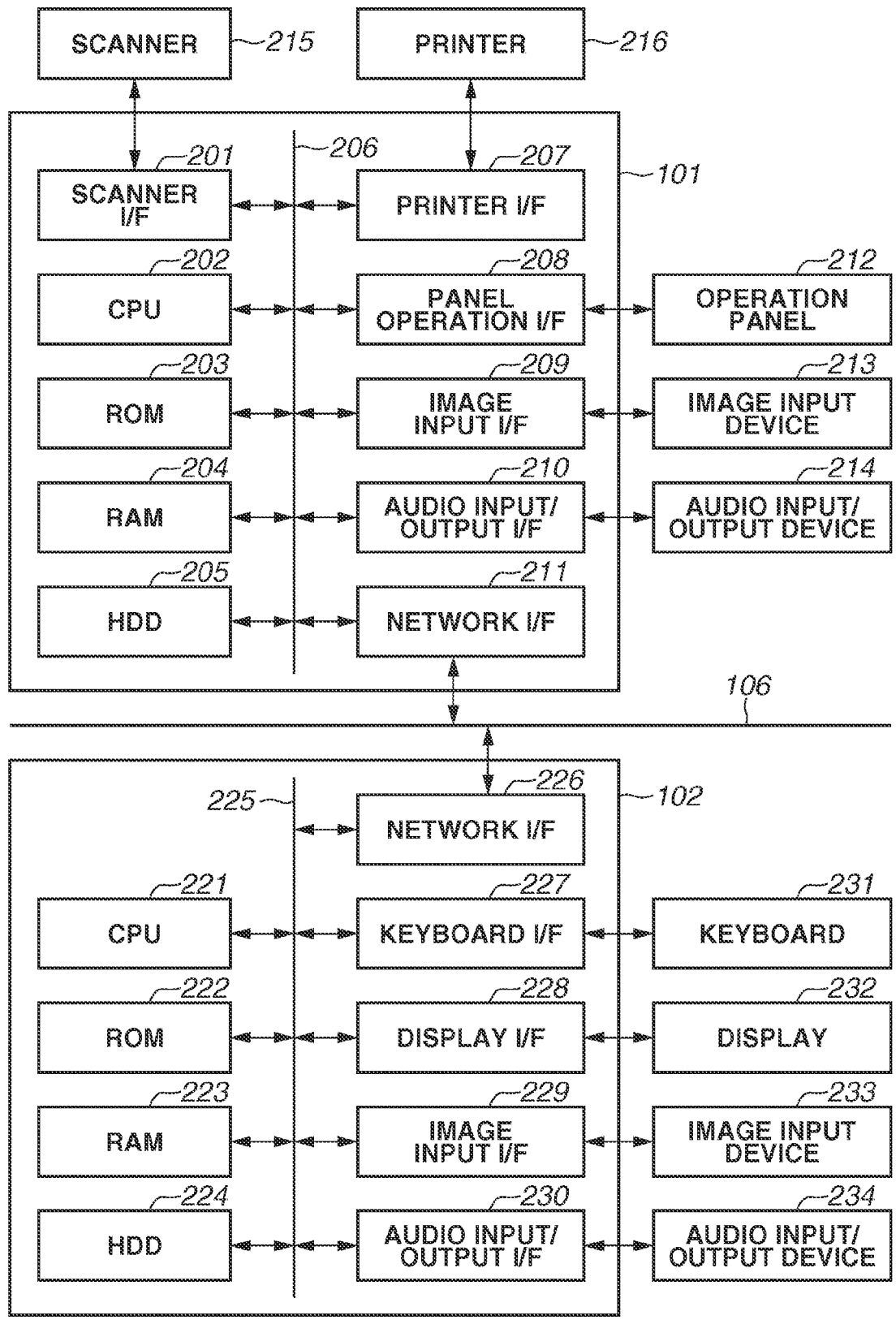
FIG. 2 illustrates hardware configurations of an image forming apparatus and a remote support apparatus.

FIG. 2 illustrates a hardware configuration of the remote support system. The image forming apparatus 101 is a kind of a computer that includes a central processing unit (CPU) ("CPU" stands for a central processing unit, and the same will apply hereafter) 202. The CPU 202 comprehensively controls access to various kinds of devices connected to a system bus 206 based on a computer program stored in a read only memory (ROM) ("ROM" stands for a read only memory, and the same will apply hereafter) 203 or a hard disk (HDD) 205. The ROM 203 stores a basic control program and other read-only data. A random access memory (RAM) ("RAM" stands for a random access memory, and the same will apply hereafter) 204 mainly functions as a main memory and a work memory of the CPU 202. Further, a memory capacity can be expanded by using an optional RAM connected to a not-illustrated expansion port. The hard disk (HDD) 205 stores a boot program, various kinds of applications, font data, a user file, an edition file, and the like. In addition to the HDD 205, a Secure Digital (SD) card, a flash memory, or the like may be used as an external storage device.

A scanner interface (I/F) ("I/F" stands for an interface, and the same will apply hereafter) 201 controls an image input from a scanner 215. A printer I/F 207 controls an image output to a printer 216. An operation panel 212 is provided with a display screen capable of visually representing information stored in the image forming apparatus 101, and a receiving screen capable of receiving an operation input to control an operation in the image forming apparatus 101. A panel operation I/F 208 displays the information on the display screen of this operation panel 212 and inputs various kinds of setting information set on the receiving screen of the operation panel 212. An image input I/F 209 acquires a support image from an image input device 213 such as a camera. An audio input/output I/F 210 inputs and outputs audio data between the image forming apparatus 101 and an audio input/output device 214 such as a headset. A network I/F 211 performs data communication with an external network via a network cable.

In the remote support apparatus 102, a CPU 221 comprehensively controls access to various kinds of devices connected to a system bus 225 based on a computer program stored in a ROM 222 or a hard disk (HDD) 224. The ROM 222 stores a basic control program and other read-only data. A RAM 223 mainly functions as a main memory, a work memory, and the like of the CPU 221. Further, the remote support apparatus 102 is configured such that a memory capacity can be expanded by using an optional RAM connected to a not-illustrated expansion port. The hard disk (HDD) 224 stores a boot program, various kinds of applications, font data, a user file, an edition file, and the like. In addition to the HDD 224, an SD card, a flash memory, or the like may be used as an external storage device.

A network I/F 226 performs data communication with an external network via a network cable. A keyboard I/F 227 controls a key input from a keyboard 231 or a not-illustrated pointing device. A display I/F 228 controls a display 232. An image input I/F 229 controls an image input from an image input device 233 such as a camera. An audio input/output I/F 230 controls an audio input/output between the remote support apparatus 102 and an audio input/output device 234 such as a headset.

Figure 3:
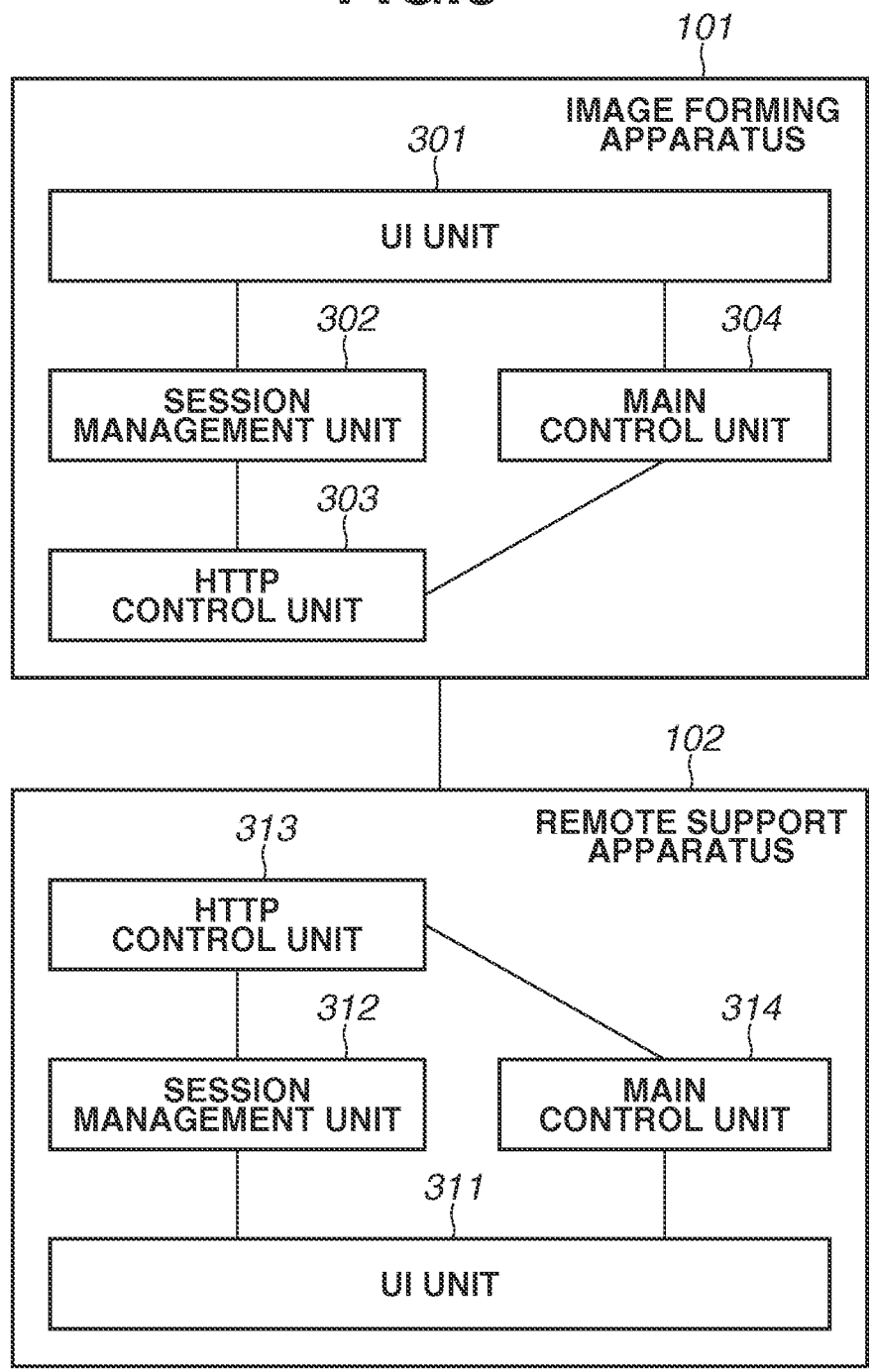
FIG. 3 illustrates software configurations of the image forming apparatus and the remote support apparatus.

FIG. 3 illustrates a software configuration of the remote support system. The CPU 202 reads and executes the above-described control program so that the image forming apparatus 101 realizes various kinds of functions. More specifically, the image forming apparatus 101 causes the hardware including the CPU 202 to function as a user interface (hereinafter referred to as a "UI unit") 301, a session management unit 302, an HTTP control unit 303, and a main control unit 304.

The UI unit 301 controls display on the display screen of the operation panel 212, and controls an input of various kinds of setting information set on the receiving screen of the operation panel 212. Further, through such control, the UI unit 301 causes the hardware to operate as a plurality of processing modules capable of performing different support processing for a user. In the present exemplary embodiment, the processing modules are a support image display module, a support image transmission module, an operation module, a first image management module, and a second image management module, and they become executable by switching as necessary.

The support image display module acquires a support image from the remote support apparatus 102, and allows the acquired support image to be displayed on the display screen of the operation panel 212. The support image transmission module acquires a support image indicating an event that has occurred in the image forming apparatus 101, and transmits the acquired support image in a form recognizable by the remote support apparatus 102. The "recognizable form" means a data structure that the remote support apparatus 102 can reproduce. The operation module transmits an operation unit image representing the receiving screen in a form recognizable by the remote support apparatus 102, and recognizes an operation content performed on the transmitted operation unit image to input an operation based on the recognized operation content. The first image management module transmits a support image in a form recognizable by the remote support apparatus 102. The second image management module allows a processed image, which is formed by processing the support image, to be displayed on the display screen provided to the image forming apparatus 101.

The session management unit 302 instructs the HTTP control unit 303 to transmit and receive data for session management according to a session start or end instruction received from the UI unit 301. In other words, the session management unit 302 operates as a communication module that establishes a connection to an external network together with the HTTP control unit 303.

The main control unit 304 comprehensively controls an operation in the image forming apparatus 101 including the UI unit 301, the session management unit 302, and the HTTP control unit 303. Further, the main control unit 304 allows, among the above-described various processing modules, a processing module, based on a request from the remote support apparatus 102, to perform the support processing in cooperation with the UI unit 301. More specifically, the main control unit 304 acquires support type data that indicates a selection of a processing module, a request to switch the processing module, and a request to perform the support processing via the HTTP control unit 313. Then, the main control unit 304 determines a support type from the acquired support type data. Further, the main control unit 304 switches the processing module according to the request to switch the processing module and causes the switched processing module to perform the support processing. Further, the main control unit 304 performs control to transmit a result which should be returned to the remote support apparatus 102, among results of the performed support processing, via the HTTP control unit 303.

Similarly, the CPU 221 reads and executes the control program, through which the remote support apparatus 102 also realizes various kinds of functions. More specifically, the remote support apparatus 102 causes the hardware including the CPU 221 to function as a UI unit 311, a session management unit 312, an HTTP control unit 313, and a main control unit 314.

The UI unit 311 controls a key input from a keyboard, and controls what is displayed on the display 232 via the keyboard I/F 227 and the display I/F 228. Further, the UI unit 311 also controls an input/output of audio data and image data via the audio input/output I/F 230, the display I/F 228, and the image input I/F 229. Further, by this control, the UI unit 311 operates as a module selection unit that selects any of the plurality of processing modules to be realized in the image forming apparatus 101. Further, the UI unit 311 operates as an output unit that outputs a request to perform the support processing by the processing module selected via the module selection unit, or a request to switch the processing module to a specific processing module after the selection and a request to perform the support processing by the switched processing module.

The session management unit 312 instructs the HTTP control unit 313 to transmit and receive data for session management according to a session start or end instruction received from the UI unit 311. In other words, the session management unit 312 operates as a communication module together with the HTTP control unit 313.

The main control unit 314 comprehensively controls an operation in the remote support apparatus 102 including the UI unit 311, the session management unit 312, and the HTTP control unit 313.

Further, the main control unit 314 supports, for example, execution of the support processing by the above-described various processing modules, in cooperation with the UI unit 311. Further, the main control unit 314 operates as an image processing module that performs image processing such as insertion of a character, a symbol, and the like input from the keyboard 231, on a process target image. The process target image is transmitted or provided via the network I/F 226 that acquires an image from the network 106, or the image input device 233 and the image input I/F 229 that acquire an image from the user. Further, the main control unit 314 operates as a support processing result acquisition unit that acquires a result which should be acquired, among results of the support processing performed in the image forming apparatus 101, via the network I/F 226.

[Remote Support Method]

Next, a remote support method that becomes executable by the remote support system configured in the above-described manner will be described.

Figure 4:
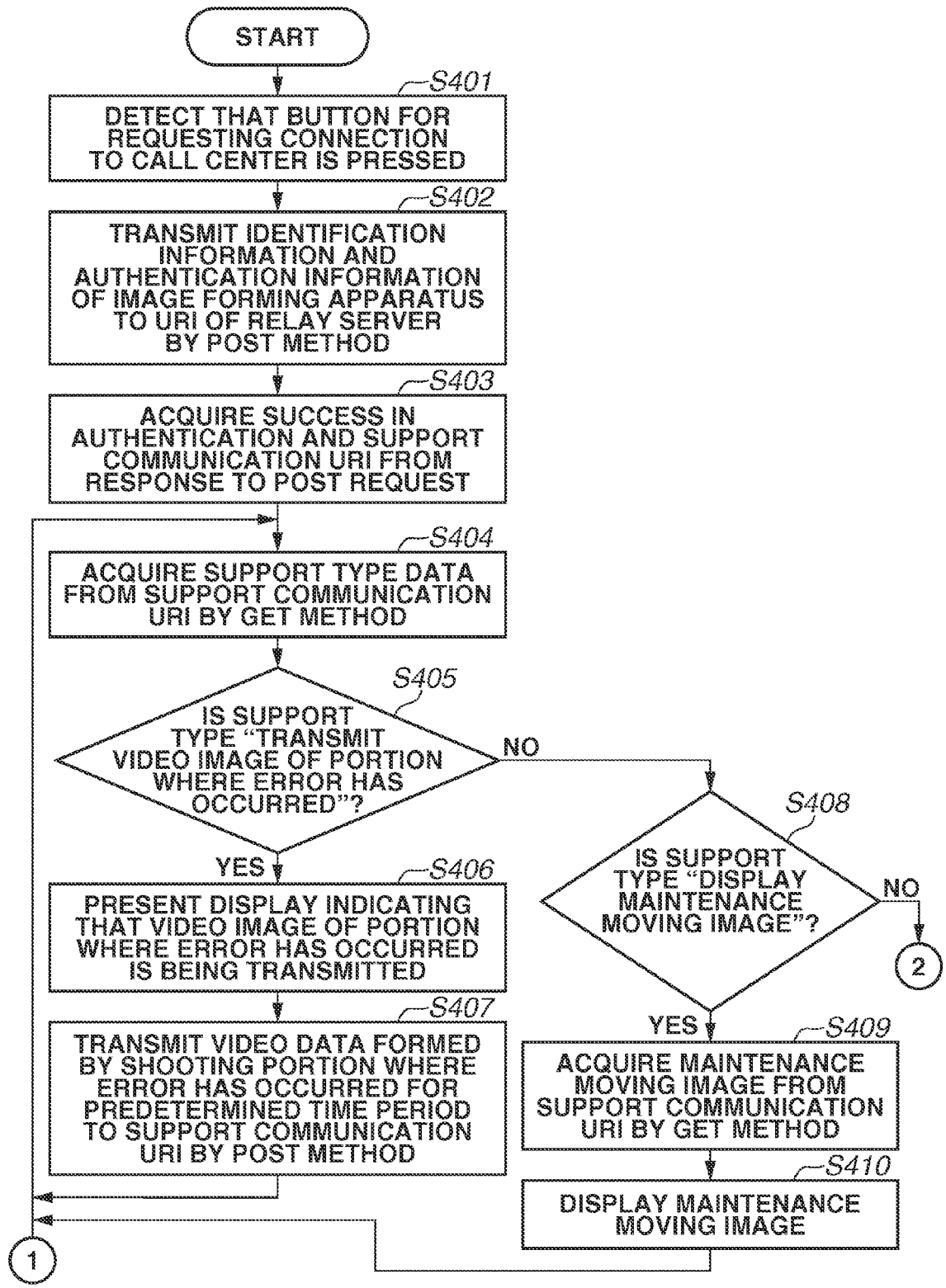
FIG. 4 is a flowchart (1) illustrating a procedure performed in the image forming apparatus.
Figure 5:
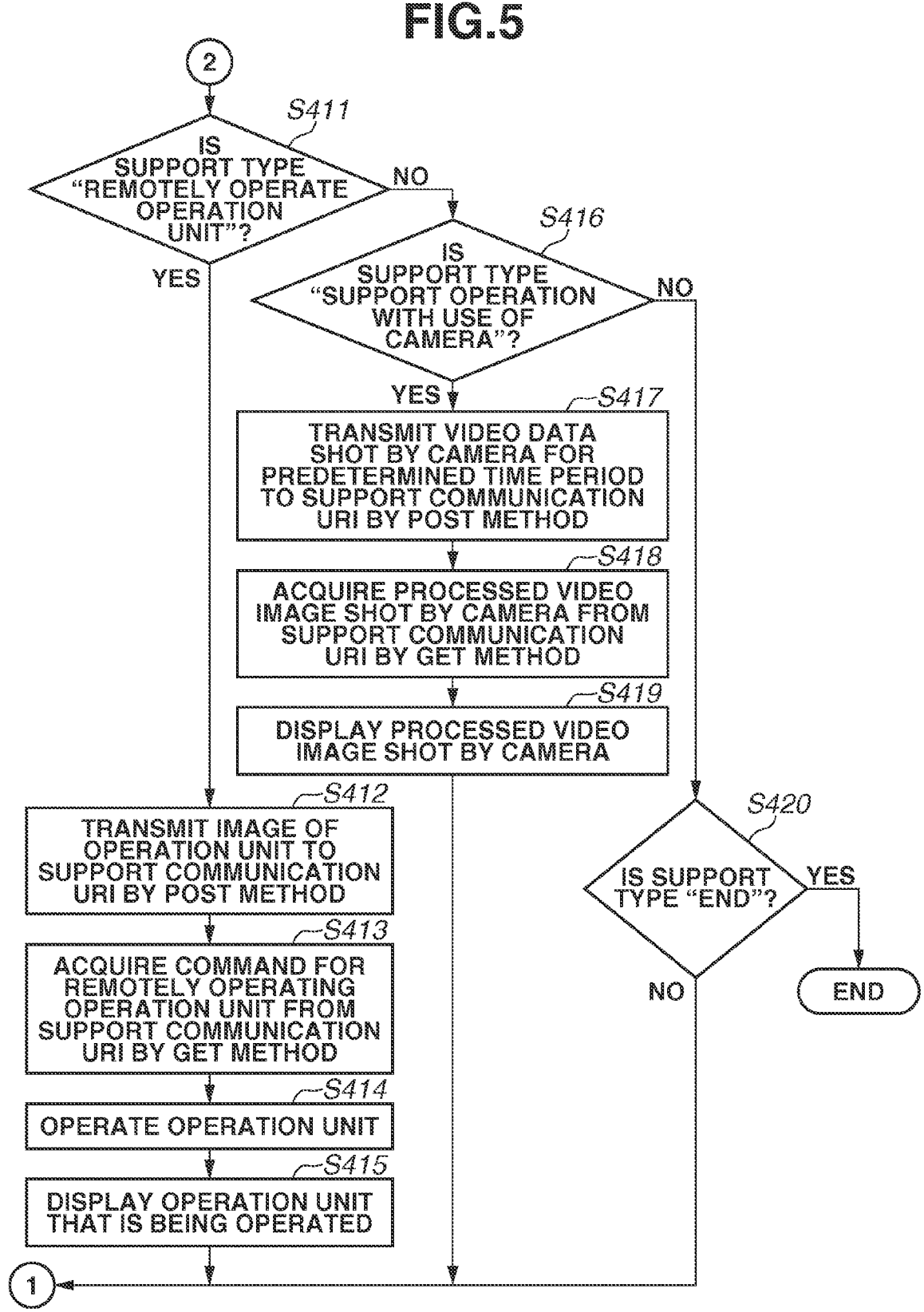
FIG. 5 is a flowchart (2) illustrating the procedure performed in the image forming apparatus.

First, a procedure performed in the image forming apparatus 101 will be described with reference to FIGS. 4 and 5. In step S401, the UI unit 301 of the image forming apparatus 101 detects that a button for requesting a connection to the call center is pressed from the panel operation I/F 208. In response thereto, in step S402, the session management unit 302 transmits identification information and authentication information of the image forming apparatus 101 to a URI of the HTTP relay server 103, which is stored in the HDD 205 in advance, via a POST request. The identification information is, for example, a serial number of the image forming apparatus 101. The authentication information is, for example, an identification (ID) and a password assigned to the image forming apparatus 101. This processing causes the HTTP relay server 103 to authenticate the image forming apparatus 101 and relay a session between the image forming apparatus 101 and the waiting remote support apparatus 102.

For example, the identification information of the image forming apparatus 101 transmitted via the POST request is used as information associating the image forming apparatus 101 with the remote support apparatus 102. The HTTP relay server 103 generates a support communication URI that allows the image forming apparatus 101 and the remote support apparatus 102 to exchange support information with each other, and transmits the generated URI to the image forming apparatus 101 and the remote support apparatus 102.

In step S403, the session management unit 302 acquires a success in the authentication and the support communication URI from a "Response" to the POST request. Alternatively, the image forming apparatus 101 may acquire the success in the authentication and the support communication URI by newly issuing a GET request.

The processing performed in this manner completes a step in which the HTTP relay server 103 establishes an HTTP communication path between the image forming apparatus 101 and the remote support apparatus 102.

Next, the image forming apparatus 101 operates according to the following steps. In step S404, the main control unit 304 acquires support type data that indicates a selection of a processing module, a request to switch the processing module, and a request to perform the support processing from the support communication URI acquired by the session management unit 302 via a GET request. Then, in each of steps S405, S408, S411, S416, and S420, the main control unit 304 determines a support type from the acquired support type data.

In step S405, the main control unit 304 determines whether the acquired support type is "transmit a video image of a portion where an error has occurred". The support "transmit a video image of a portion where an error has occurred" is performed to cause the image forming apparatus 101 (the UI unit 301) to operate as the support image transmission module (switch the processing module to the support image transmission module and execute the support image transmission module). More specifically, the support image transmission module shoots a portion where an error has occurred in the image forming apparatus 101 with use of a camera, and transmits video data acquired therefrom to the remote support apparatus 102. The support image transmission module may use a camera mounted in the image forming apparatus 101 in advance or may use an external camera. In the latter case, the acquired video data is stored into the HDD 224 via the image input device 233 and the image input I/F 229, and is read out as necessary. The support image transmission module performs the support processing, by which the video data reaches the remote support apparatus 102, and is displayed on the display 232. Therefore, an operator handling the remote support apparatus 102 can visually understand what kind of error has specifically occurred in the image forming apparatus 101.

While it is determined that the support type is "transmit a video image of a portion where an error has occurred" in step S405 (YES in step S405) and the video data is being transmitted, in step S406, the UI unit 301 presents display indicating that the video data is being transmitted, on the display screen of the operation panel 212. After that, in step S407, the main control unit 304 sends video data formed by shooting the portion where the error has occurred for a predetermined time period to the support communication URI via a POST request. After the video data is transmitted via the POST request, the processing returns to step S404. In step S404, the main control unit 304 determines a next support type. Alternatively, the processing may proceed according to such a procedure that the main control unit 304 continues transmitting stream data via a POST request, and stops transmitting the POST when the main control unit 304 asynchronously acquires a URI of next support type data via a GET request.

If the main control unit 304 determines that the support type is not "transmit a video image of a portion where an error has occurred" in step S405 (NO in step S405), in step S408, the main control unit 304 determines whether the support type is "display a maintenance moving image". The support "display a maintenance moving image" is performed to cause the image forming apparatus 101 (the UI unit 301) to operate as the support image display module (switch the processing module to the support image display module and execute the support image display module). More specifically, the support image display module reproduces a moving image that indicates a procedure for maintaining the image forming apparatus 101, on the operation panel 212. If this processing is carried out, the user can perform the maintenance procedure without being at a loss. The maintenance moving image is one example of the support image, and the support image is not limited to this example.

If the main control unit 304 determines that the support type is "display a maintenance moving image" in step S408 (YES in step S408), in step S409, the main control unit 304 acquires the maintenance moving image from the support communication URI via a GET request. Further, in step S410, the UI unit 301 displays the acquired maintenance moving image on the operation panel 212. After the display ends, the processing returns to step S404. In step S404, the main control unit 304 determines a next support type.

If the main control unit 304 determines that the support type is not "display a maintenance moving image" in step S408 (NO in step s408), in step S411, the main control unit 304 determines whether the support type is "remotely operate the operation unit". The support "remotely operate the operation unit" is performed to cause the image forming apparatus 101 (the UI unit 301) to operate as the operation module, which enables the operator to manipulate the panel operation I/F 208 from the remote support apparatus 102, (switch the processing module to the operation module and execute the operation module). When this support processing is carried out, the operator performs a setting operation from a remote location, whereby the operator can smoothly solve the trouble even when the operator cannot suitably make a conversation with the user.

If the main control unit 304 determines that the support type is "remotely operate the operation unit" in step S411 (YES in step S411), in step S412, the main control unit 304 transmits an image displayed on the operation panel 212 to the support communication URI via a POST request. After that, in step S413, the main control unit 304 acquires a remote operation command from the support communication URI via a GET request. The remote operation command is, for example, a command instructing "a specific position in an XY coordinate system on the operation unit is clicked". In step S414, the UI unit 301 operates the panel operation I/F 208 according to the remote operation command acquired by the main control unit 304. Further, in step S415, the UI unit 301 displays a kind of operation which is being performed on the operation panel 212. After that, the processing returns to step S404. In step S404, the main control unit 304 determines a next support type.

If the main control unit 304 determines that the support type is not "remotely operate the operation unit" in step S411 (NO in step S411), in step S416, the main control unit 304 determines whether the support type is "support an operation with use of a camera". The support "support an operation with use of a camera" is performed to carry out an operation as the first image management module, by which a portion of the image forming apparatus 101 that needs maintenance is shot with use of a camera and video data acquired therefrom is transmitted to the remote support apparatus 102 (switch the processing module to the first image management module and execute the first image management module). The first image management module may use the camera mounted in the image forming apparatus 101 in advance or may use an external camera. In the latter case, the acquired video data is stored into the HDD 224 via the image input device 233 and the image input I/F 229, and is read out as necessary.

Further, this support is also performed to carry out operation as the second image management module (switch the processing module to the second image management module and execute the second image management module). After the video data is processed by the remote support apparatus 102, the second image management module acquires and displays processed image acquired therefrom. When these kinds of support processing are performed, the user can clearly understand which spot the user has to deal with in the maintenance portion shot by the camera, thereby smoothly solving the trouble.

If the main control unit 304 determines that the support type is "support an operation with use of a camera" in step S416 (YES in step S416), in step S417, the main control unit 304 transmits the video data formed by shooting the portion required to be maintained with use of the camera for a predetermined time period, to the support communication URI via a POST request. Further, in step S418, the main control unit 304 acquires the video data processed in the remote support apparatus 102 from the support communication URI via a GET request. As an example of the image processing performed in the remote support apparatus 102, the operator combines a pointer or an explanatory text with the video data.

In step S419, the UI unit 301 displays the acquired processed image on the operation panel 212. After the end of the display, the processing returns to step S404. In step S404, the main control unit 304 determines a next support type.

If the main control unit 304 determines that the support type is not "support an operation with use of a camera" in step S416 (NO in step S416), in step S420, the main control unit 304 determines whether the support type is "end". If the support type is "end" (YES in step S420), the processing ends. If the support type is not "end" (NO in step S420), the processing returns to step S404. In step S404, the main control unit 304 determines a next support type.

Figure 6:
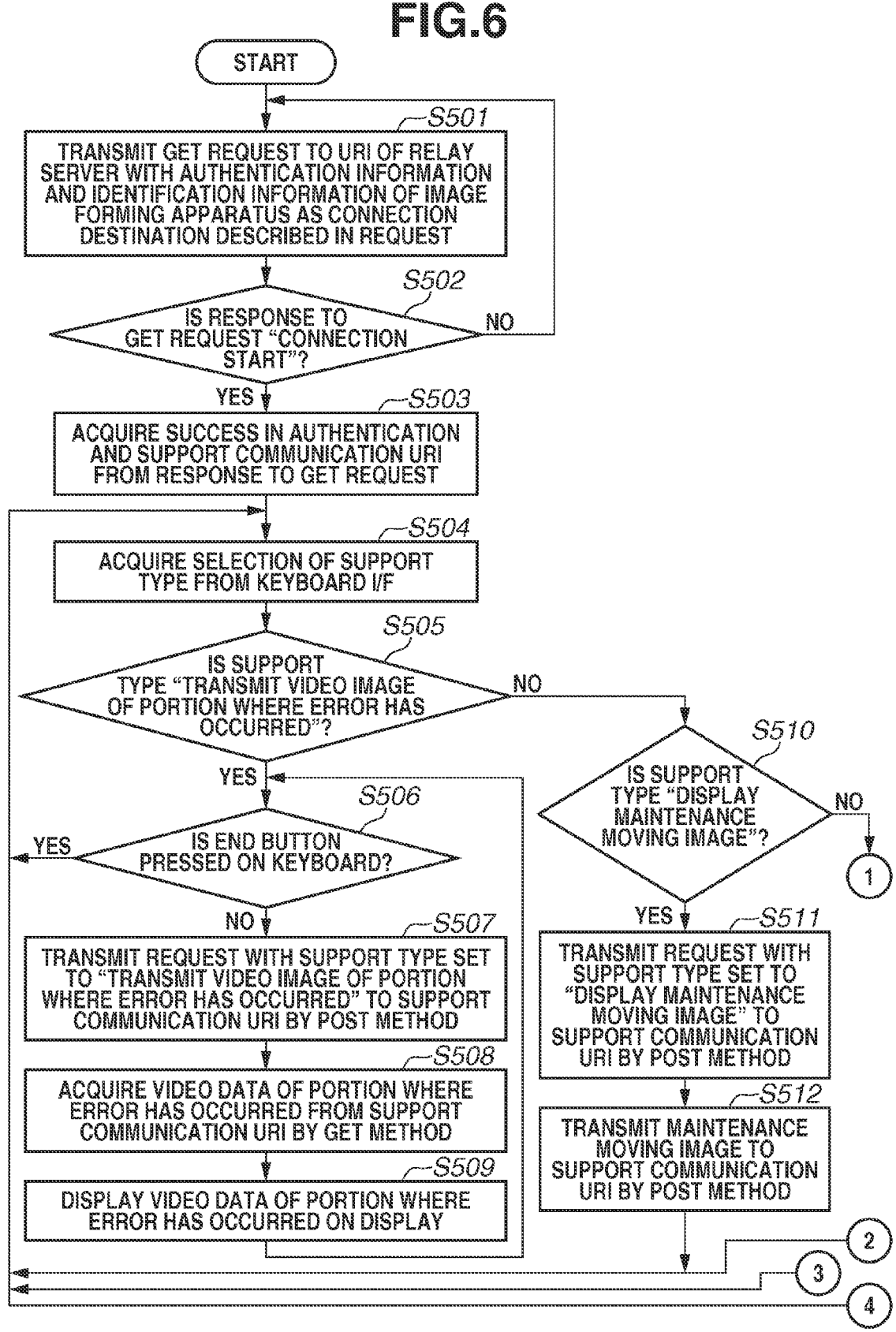
FIG. 6 is a flowchart (1) illustrating a procedure performed in the remote support apparatus.
Figure 7:
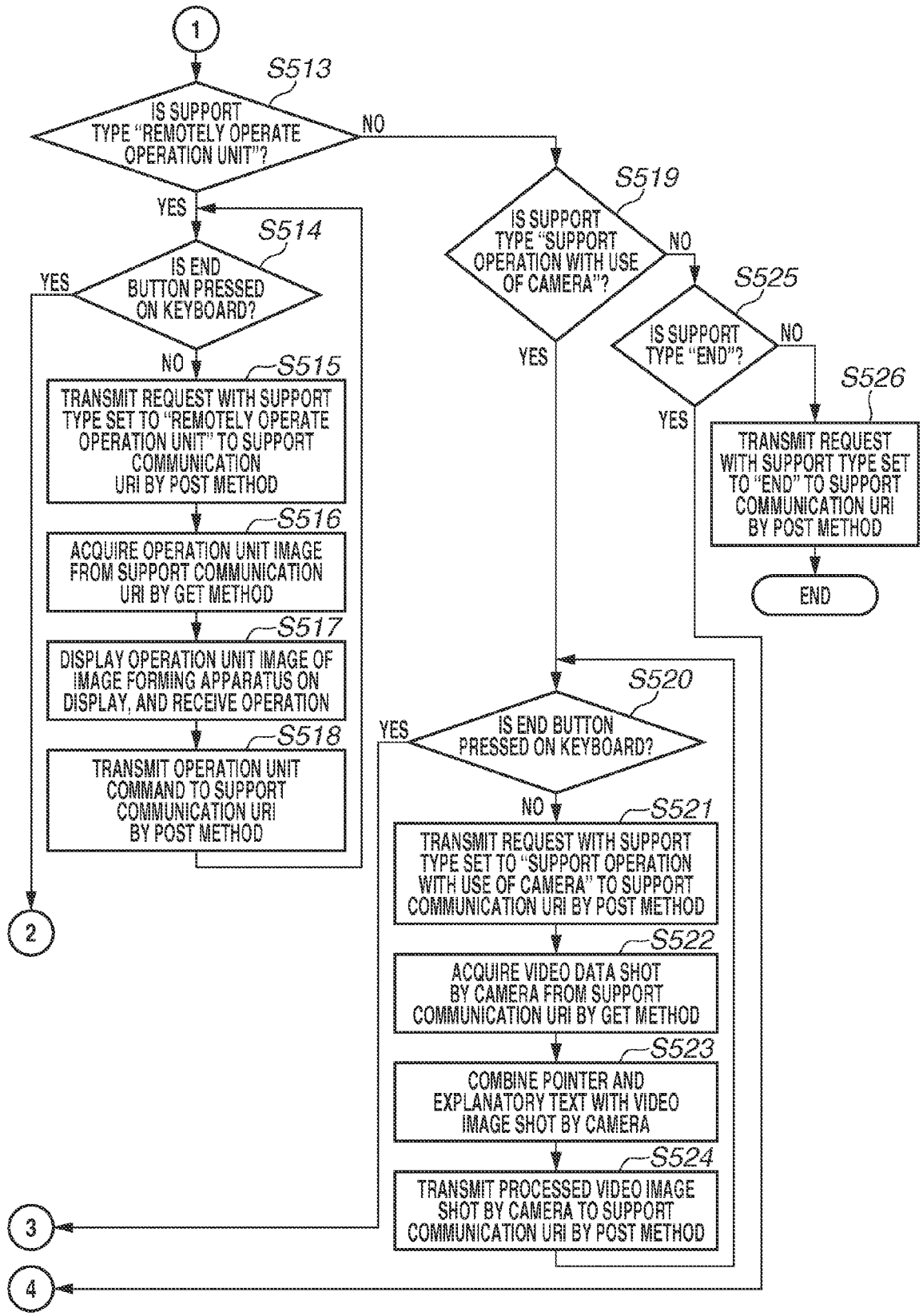
FIG. 7 is a flowchart (2) illustrating the procedure performed in the remote support apparatus.

Next, a procedure performed in the remote support apparatus 102 will be described with reference to FIGS. 6 and 7. In step S501, the session management unit 312 of the remote support apparatus 102 carries out GET transmission to the URI of the HTTP relay server 103 with authentication information and the identification information of the image forming apparatus 101 described in a "Request". Because the URI of the HTTP relay server 103 is registered in the HDD 224 in advance, the session management unit 312 refers thereto. For example, an ID and a password are used as the authentication information. The serial number of the image forming apparatus 101, for example, is used as the identification information. This processing allows the HTTP relay server 103 to relay a session between the image forming apparatus 101 and the remote support apparatus 102.

In step S502, the session management unit 312 determines whether a "Response" to the GET request is a description of a connection start. If the "Response" is not a description of a connection start (NO in step S502), the processing returns to step S501. In step S501, the session management unit 312 carries out GET transmission again. If the "Response" is a description of a connection start in step S502 (YES in step S502), in step S503, the session management unit 312 acquires a success in the authentication and the support communication URI from the "Response".

The processing performed in this manner completes the step in which the HTTP relay server 103 establishes the HTTP communication path between the image forming apparatus 101 and the remote support apparatus 102.

Next, the remote support apparatus 102 operates according to the following steps. In step S504, the UI unit 311 receives a selection or switching of a support type from the keyboard I/F 227. After that, in steps S505, S510, S513, S519, and S525, the UI unit 311 determines the support type.

In step S505, the UI unit 311 determines whether the received support type is "transmit a video image of a portion where an error has occurred". If the support type is "transmit a video image of a portion where an error has occurred" (YES in step S505), in step S506, the UI unit 311 determines whether an "end" of the support is received from the keyboard I/F 227. If an "end" is received (YES in step S506), the processing returns to step S504. In step S504, the UI unit 311 receives a next support type. If an "end" is not received (NO in step S506), the UI unit 311 notifies the main control unit 314 to that effect.

In step S507, the main control unit 314 generates a "Request" with the support type set to "transmit a video image of a portion where an error has occurred", and transmits the generated "Request" to the support communication URI as a POST request. After that, in step S508, the main control unit 314 acquires the video data of the portion where the error has occurred from the support communication URI via a GET request.

In step S509, the UI unit 311 causes the display I/F 228 to display the video data acquired by the main control unit 314. After the video data is displayed, the processing returns to step S506, and the processing continues.

If the UI unit 311 determines that the support type is not "transmit a video image of a portion where an error has occurred" in step S505 (NO in step S505), in step S510, the UI unit 311 determines whether the support type is "display a maintenance moving image". If the UI unit 311 determines that the support type is "display a maintenance moving image" (YES in step S510), the UI unit 311 notifies the main control unit 314 to that effect.

In step S511, the main control unit 314 generates a "Request" with the support type set to "display a maintenance moving image", and transmits the generated "Request" to the support communication URI as a POST request. Further, in step S512, the main control unit 314 transmits a predetermined maintenance moving image stored in the HDD 224 to the support communication URI via a POST request. After that, the processing returns to step S504. In step S504, the UI unit 311 receives a selection of a next support type.

If the UI unit 311 determines that the support type is not "display a maintenance moving image" (NO in step S510), in step S513, the UI unit 311 determines whether the support type is "remotely operate the operation unit". If the support type is "remotely operate the operation unit" (YES in step S513), in step S514, the UI unit 311 determines whether an "end" of the selected support is received from the keyboard I/F 227. If an "end" is received (YES in step S514), the processing returns to step S504. In step S504, the UI unit 311 receives a selection of a next support type. If an "end" is not received (NO in step S514), the UI unit 311 notifies the main control unit 314 to that effect.

In step S515, the main control unit 314 generates a "Request" with the support type set to "remotely operate the operation unit", and transmits the generated "Request" to the support communication URI as a POST request. Further, in step S516, the main control unit 314 acquires the operation unit image of the operation panel 212 of the image forming apparatus 101 from the support communication URI via a GET request.

In step S517, the UI unit 311 causes the display I/F 228 to display the operation unit image acquired by the main control unit 314, and acquires an operation content input to the operation unit image from the keyboard I/F 227. In step S518, the main control unit 314 transmits the operation content to the support communication URI as the remote operation command via a POST request. After that, the processing returns to step S514, and the processing continues.

If the UI unit 311 determines that the support type is not "remotely operate the operation unit" in step S513 (NO in step S513), in step S519, the UI unit 311 determines whether the support type is "support an operation with use of a camera". If the support type is "support an operation with use of a camera" (YES in step S519), in step S520, the UI unit 311 determines whether an "end" of the selected support is received from the keyboard I/F 227. If an "end" is received (YES in step S520), the processing returns to step S504, in which the UI unit 311 receives a selection of a next support type. If an "end" is not received (NO in step S520), the UI unit 311 notifies the main control unit 314 to that effect.

In step S521, the main control unit 314 generates a "Request" with the support type set to "support an operation with use of a camera", and transmits the generated "Request" to the support communication URI as a POST request. Then, in step S522, the main control unit 314 acquires the video data transmitted from the image forming apparatus 101, from the support communication URI via a GET request.

In step S523, the UI unit 311 causes the display I/F 228 to display the video data acquired by the main control unit 314, and receives an instruction to process the video data from the keyboard I/F 227. At this time, the remote support apparatus 102 operates as the image processing module. As an example of the image processing performed by this image processing module, the operator combines a pointer or an explanatory text with the video image. In step S524, the main control unit 314 transmits the processed image acquired therefrom to the support communication URI via a POST request. After that, the processing returns to step S520, and the processing continues.

If the selected support is not "support an operation with use of a camera" in step S519 (NO in step S519), in step S525, the UI unit 311 determines whether the support type is "end". If the support type is "end" (YES in step S525), in step S526, the main control unit 314 generates a "Request" with the support type set to "end", and transmits the generated "Request" to the support communication URI as a POST request. After that, the processing ends. If the support type is not "end" in step S525 (NO in step S525), the processing returns to step S504. In step S504, the UI unit 311 receives a selection of a next support type.

In this manner, in the remote support system according to the present exemplary embodiment, the request (the request to switch the processing module and the request to perform the support processing) according to the support type is transmitted from the remote support apparatus 102 to the image forming apparatus 101, in which the processing module is switched as appropriate and the support processing is performed accordingly. Therefore, even if an unexpected event unsupportable by the support side occurs because its cause and solution are not expected and prepared in advance, such an event can be flexibly handled.

For example, when the support type selected by the remote support apparatus 102 or the support type when the request to switch the processing module is transmitted is "transmit a video image of a portion where an error has occurred", the image forming apparatus 101 operates as the support image transmission module. For example, when an error has occurred in the image forming apparatus 101, video data formed by shooting an error portion is transmitted to the remote support apparatus 102. Therefore, the operator operating the remote support apparatus 102 can correctly and specifically understand what kind of error has occurred in the image forming apparatus 101. After that, the operator can teach an appropriate recovery procedure to the user by transmitting a request to switch the processing module to another processing module and a request to perform the support processing as needed.

Further, when the support type is "display a maintenance moving image", the image forming apparatus 101 operates as the support image display module. For example, when it is appropriate for the remote support apparatus 102 to reproduce the moving image that indicates the maintenance procedure for the image forming apparatus 101, the support image display module reproduces the moving image that indicates the maintenance procedure on the operation panel 212. The support image may be document data such as an operation manual, or may be a moving image that shows a demonstration of the maintenance. As a result, the user can perform the maintenance procedure without being at a loss.

Further, when the support type is "remotely operate the operation unit", the image forming apparatus 101 operates as the operation module. In other words, the operation module follows the request to perform the support processing, and allows the operator to operate the panel operation I/F 208 of the image forming apparatus 101 via the remote support apparatus 102. At this time, the operation module also transfers an image displayed on the operation screen of the operation panel 212 of the image forming apparatus 101 to the remote support apparatus 102. Then, upon acquiring the remote operation command (the command instructing "a specific position in the XY coordinate system on the operation unit is clicked") from the remote support apparatus 102, the operation module performs processing according to a further request to perform the support processing. How the panel operation I/F 208 is being operated according to the acquired remote operation command is displayed on the display screen of the operation panel 212. As a result, the user can visually understand a content that the operator wants to convey.

When the support type is "support an operation with use of a camera", the image forming apparatus 101 operates as the first image management module. At this time, video data formed by shooting a portion requiring maintenance in the image forming apparatus 101 is transmitted to the remote support apparatus 102. After that, the image forming apparatus 101 is switched to the second image management module according to the request to switch the processing module. Then, the second image management module acquires processed image subjected to the processing such as combining with explanatory texts or the like performed thereon, and displays the acquired processed image on the display screen of the operation panel 212, according to the request to perform the support processing thereby. As a result, the user can clearly understand a portion which the user has to deal with in the video data, and therefore can smoothly solve the trouble.

Among results of the support processing performed by the respective processing modules of the image forming apparatus 101, only a result which should be returned, is returned to the remote support apparatus 102. Therefore, the present remote support system can avoid returning information that is not necessarily required in providing support, thereby allowing the support side to provide support sought by the user more quickly and efficiently.

The present exemplary embodiment has been described based on the example in which the electronic apparatus connected to the remote support apparatus 102 is the image forming apparatus 101. However, the present invention is not limited to the image forming apparatus. The electronic apparatus may be any type of electronic apparatus as long as it can execute a plurality of processing modules for performing different support processing for the user asking for support while switching them as appropriate. The present invention can be applied even to a game machine or another type of information processing apparatus.

According to the exemplary embodiment of the present invention, the remote support apparatus can cause the electronic apparatus to selectively perform any of the support processing using the plurality of processing units, and can issue the request to switch the processing unit to a selected specific processing unit, and the request to perform the support processing using the switched processing unit as needed. Further, the exemplary embodiment of the present invention does not require the electronic apparatus to return all of results of the support processing performed by the respective processing units of the electronic apparatus but causes the electronic apparatus to return only a result which should be returned to the remote support apparatus. Therefore, the exemplary embodiment of the present invention can avoid returning information that is not necessarily required in providing support. This arrangement allows the support side to provide support sought by the user more correctly, quickly, and efficiently.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171550 filed Aug. 21, 2013, which is hereby incorporated by reference herein in its entirety.

What is claimed is:

1. A remote support system in which a support apparatus remotely supports an information processing apparatus via a relay server using HTTP communication, the system comprising:
a support apparatus including,
a selection unit configured to select support processing from among a plurality of support processing including a first support processing for remotely operating an operation panel of the information processing apparatus and a second support processing for displaying an image for supporting a user of the information processing apparatus on the operation panel of the information processing apparatus,
a transmission unit configured to transmit information indicating the support processing selected by the selection unit to the relay server according to a POST request,
a first support unit configured to, in a case where the first support processing is selected by the selection unit, receive an image displayed on the operation panel of the information processing apparatus from the relay server according to a GET request, to display the received image on a display unit of the support apparatus, and to transmit an operation command based on an operation with respect to the displayed image to the relay server according to a POST request, and
a second support unit configured to, in a case where the second support processing is selected by the selection unit, transmit an image for supporting a user of the information processing apparatus to the relay server according to a POST request; and
an information processing apparatus including,
a reception unit configured to receive the information indicating the support processing selected by the selection unit, which has been transmitted by the transmission unit to the relay server, according to a GET request,
a first supported unit configured to, in a case where the information indicating support processing indicates the first support processing, transmit the image displayed on the operation panel of the information processing apparatus to the relay server according to a POST request, to receive the operation command for operating the operation panel from the relay server according to a GET request, and to control the operation panel based on the received operation command, and
a second supported unit configured to, in a case where the information indicating support processing indicates the second support processing, receive an image for supporting a user of the information processing apparatus from the relay server according to a GET request, and to display the received image on the operation panel.

2. The remote support system according to claim 1, wherein the information processing apparatus further includes,
a storage unit configured to store a first Uniform Resource Identifier (URI) of the relay server, and
a first acquisition unit configured to transmit authentication information according to a POST request with respect to the first URI and to acquire a second URI for performing communication for remote support, according to an authentication result based on the authentication information,
wherein the support apparatus further includes,
a second acquisition unit configured to acquire a second URI from the relay server according to a GET request with respect to the first URI, and
wherein the information processing apparatus and the support apparatus perform communication via the relay server using the second URI acquired by the first acquisition unit and the second acquisition unit.

3. The remote support system according to claim 1, wherein the operation command includes information indicating an operational position on the operation panel.

4. The remote support system according to claim 1, wherein support processing that can be selected by the selection unit includes a third support processing for displaying video data of a portion where an error has occurred in the image processing apparatus on the support apparatus,
wherein the support apparatus further includes a third support unit configured to, in a case where the third support processing is selected by the selection unit, receive the video data of the portion where the error has occurred from the relay server according to a GET request, and to display the received video data, and
wherein the information processing apparatus further includes a third supported unit configured to, in a case where the information indicating support processing indicates the third support processing, transmit the video data of the portion where the error has occurred to the relay server according to a POST request.

5. A support apparatus capable of remotely supporting an information processing apparatus via a relay server using HTTP communication, the apparatus comprising:
a selection unit configured to select support processing from among a plurality of support processing including a first support processing for remotely operating an operation panel of the information processing apparatus and a second support processing for displaying an image for supporting a user of the information processing apparatus on the operation panel of the information processing apparatus;
a transmission unit configured to transmit information indicating the support processing selected by the selection unit to the relay server according to a POST request;
a first support unit configured to, in a case where the first support processing is selected by the selection unit, receive an image displayed on the operation panel of the information processing apparatus from the relay server according to a GET request, to display the received image on a display unit of the support apparatus, and to transmit an operation command based on an operation with respect to the displayed image to the relay server according to a POST request; and a second support unit configured to, in a case where the second support processing is selected by the selection unit, transmit an image for supporting a user of the information processing apparatus to the relay server according to a POST request.

6. The support apparatus according to claim 5, further comprising:

a storage unit configured to store a first Uniform Resource Identifier (URI) of the relay server; and an acquisition unit configured to acquire a second URI from the relay server according to a GET request with respect to the first URI, wherein the support apparatus perform communication with the information processing apparatus and via the relay server using the second URI acquired by the acquisition unit.

7. An information processing apparatus capable of receiving a remote support from a support apparatus capable of performing a plurality of support processing including a first support processing for remotely operating an operation panel of the information processing apparatus and a second support processing for displaying an image for supporting a user of the information processing apparatus on the operation panel of the information processing apparatus, via a relay server using HTTP communication, the apparatus comprising:

a reception unit configured to receive information indicating support processing selected by the support apparatus according to a GET request;

a first supported unit configured to, in a case where the information indicating support processing indicates the first support processing, transmit the image displayed on the operation panel of the information processing apparatus to the relay server according to a POST request, to receive the operation command for operating the operation panel from the relay server according to a GET request, and to control the operation panel based on the received operation command, and a second supported unit configured to, in a case where the information indicating support processing indicates the second support processing, receive an image for supporting the information processing apparatus from the relay server according to a GET request, and to display the received image on the operation panel.

8. The information processing apparatus according to claim 7, further comprising:

a storage unit configured to store a first Uniform Resource Identifier (URI) of the relay server; and an acquisition unit configured to transmit authentication information according to a POST request with respect to the first URI and to acquire a second URI for performing communication for remote support, according to an authentication result based on the authentication information, wherein the information processing apparatus performs communication with the support apparatus via the relay server using the second URI acquired by the acquisition unit.

9. The information processing apparatus according to claim 7, further comprising a scanner unit configured to read an image on an original document and generate image data.

10. The information processing apparatus according to claim 7, further comprising a printing unit configured to print image data on a sheet.

11. A method in which a support apparatus remotely supports an information processing apparatus via a relay server using HTTP communication, the method comprising:

under control of the support apparatus, selecting support processing from among a plurality of support processing including a first support processing for remotely operating an operation panel of the information processing apparatus and a second support processing for displaying an image for supporting a user of the information processing apparatus on the operation panel of the information processing apparatus, transmitting information indicating the selected support processing to the relay server according to a POST request, in a case where the first support processing is selected, receiving an image displayed on the operation panel of the information processing apparatus from the relay server according to a GET request, displaying the received image on a display unit of the support apparatus, and transmitting an operation command based on an operation with respect to the displayed image to the relay server according to a POST request, and in a case where the second support processing is selected, transmitting an image for supporting a user of the information processing apparatus to the relay server according to a POST request; and under control of the information processing apparatus, receiving the information indicating the selected support processing, which has been transmitted to the relay server, according to a GET request, in a case where the information indicating support processing indicates the first support processing, transmitting the image displayed on the operation panel of the information processing apparatus to the relay server according to a POST request, receiving the operation command for operating the operation panel from the relay server according to a GET request, and controlling the operation panel based on the received operation command, and in a case where the information indicating support processing indicates the second support processing, receiving an image for supporting a user of the information processing apparatus from the relay server according to a GET request, and displaying the received image on the operation panel.

12. A method of remotely supporting an information processing apparatus via a relay server using HTTP communication, the method comprising:

selecting support processing from among a plurality of support processing including a first support processing for remotely operating an operation panel of the information processing apparatus and a second support processing for displaying an image for supporting a user of the information processing apparatus on the operation panel of the information processing apparatus;

transmitting information indicating the selected support processing to the relay server according to a POST request;

in a case where the first support processing is selected, receiving an image displayed on the operation panel of the information processing apparatus from the relay server according to a GET request, displaying the received image on a display unit of a support apparatus, and transmitting an operation command based on an operation with respect to the displayed image to the relay server according to a POST request; and in a case where the second support processing is selected, transmitting an image for supporting a user of the information processing apparatus to the relay server according to a POST request.

13. A method of receiving a remote support from a support apparatus capable of performing a plurality of support processing including a first support processing for remotely operating an operation panel of an information processing apparatus and a second support processing for displaying an image for supporting a user of the information processing apparatus on the operation panel of the information processing apparatus, via a relay server using HTTP communication, the method comprising:

receiving information indicating support processing selected by the support apparatus according to a GET request;

in a case where the information indicating support processing indicates the first support processing, transmitting the image displayed on the operation panel of the information processing apparatus to the relay server according to a POST request, receiving the operation command for operating the operation panel from the relay server according to a GET request, and controlling the operation panel based on the received operation command, and in a case where the information indicating support processing indicates the second support processing, receiving an image for supporting the information processing apparatus from the relay server according to a GET request, and displaying the received image on the operation panel.

\* \* \* \* \*